United States Patent Office 3,468,818
Patented Sept. 23, 1969

---

3,468,818
POLYMERS AND PROCESS OF PREPARATION
Kenneth G. Phillips, Berwyn, Ill., assignor to Nalco Chemical Company, Chicago, Ill., a corporation of Delaware
No Drawing. Filed Aug. 1, 1966, Ser. No. 569,090
Int. Cl. C08g 33/08
U.S. Cl. 260—2          15 Claims

ABSTRACT OF THE DISCLOSURE

High molecular weight water soluble polymers are prepared by polymerizing in the presence of an acidic catalyst a compound from the group consisting of ethyleneimine and monomeric N-substituted ethyleneimines with a polydiaziridinyl compound containing hydrolytically stable linkages between nitrogen and another element and stopping the reaction short of gel formation. These compounds are especially useful as coagulants and for a wide variety of other purposes.

---

This invention relates to new and useful polymers and to a method for preparing them.

It is well known that the acid initiated polymerization of ethyleneimine yields a relatively low molecular weight polymer which is substantially non-linear, as indicated by the following analysis—40% primary, 20% secondary and 40% tertiary amines. These polymers are essentially mixtures of homopolymers of varying molecular weights but the average molecular weight usually does not exceed 2,000.

Since these polymers are polyelectrolytes and are characterized by a plurality of cationic sites, one of the suggested fields of use has been the coagulation of solids in aqueous suspensions of solids. In most cases, however, these polymers have not been too effective in this field, perhaps due to their low molecular weight and also due to the fact that they are as much as 40% non-linear. Linear polymers, and especially those of high molecular weight, appear to be more effective as coagulants.

One of the objects of the present invention is to provide new and improved polymers which are substantially linear.

A further object of the invention is to provide a new and improved process for producing such polymers.

Another object of the invention is to produce new and improved polymers of higher molecular weight.

A still further object of the invention is to produce new and improved polymers having greater effectiveness as coagulants when used in aqueous suspensions of suspended solids. Other objects will appear hereinafter.

In accordance with the invention it has been found that if an N-substituted ethyleneimine is subjected to acid initiated polymerization, polymers are obtained which tend to be substantially linear. If the N-substitution is such that the grouping is easily removable by hydrolysis or other simple chemical means, then the subsequently isolated polymer or mixture of polymers is also substantially linear.

The monomers which are polymerized in accordance with the invention have the general formula:

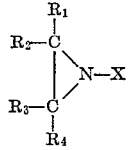

in which $R_1$, $R_2$, $R_3$ and $R_4$ represent hydrogen or a hydrocarbon group and X is a blocking group which is substituted on the nitrogen atom for the original hydrogen of the imino group. As examples of hydrocarbon groups, $R_1$, $R_2$, $R_3$ and $R_4$ can be methyl, ethyl, propyl, isopropyl, butyl, isobutyl, or higher hydrocarbon groups, or phenyl, benzyl, cyclopentyl, cyclohexyl, or other ring hydrocarbon groups. The blocking substituent X is preferably one which can be removed if desired, for example, by hydrolysis or hydrogenation. Examples of such groups are acyl, ureido, amido, guanidino, carboxyalkyl, carboxy and other groups in which the elements are composed of carbon, oxygen, nitrogen, hydrogen and/or sulfur. In most cases, the molecular weight of the blocking substituent does not exceed 120. Specific examples of such blocking substituents are

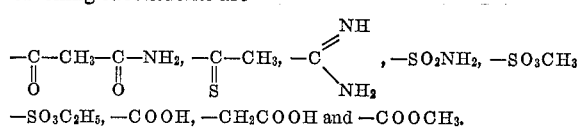

$-SO_3C_2H_5$, $-COOH$, $-CH_2COOH$ and $-COOCH_3$.

To illustrate the difference in the result obtained by the practice of the present invention, when N-acetyl ethyleneimine is used in an acid initiated polymerization, polymers have been obtained which contain 6% primary, 88% secondary and 6% tertiary amine. Thus, the quantity of tertiary amine has been substantially reduced indicating a reduction in non-linear polymers and an increase in the formation of substantially linear polymers.

The process can be carried out with any conventional acid catalyst heretofore employed in the polymerization of ethyleneimine. For example, a typical catalyst is the Lewis acid catalyst, boron trifluoride etherate. Other acid catalysts, such as hydrochloric acid, phosphoric acid, sulfuric acid and para-toluene sulfonic acid can be employed.

The mole ratio of catalyst to monomer can vary widely but is usually within the range of 1:1400 to 1:40. A practical mole ratio of catalyst to monomer to give desirable viscosity characteristics is about two mole per cent.

Polymerizations can be carried out in the absence of a solvent or in the presence of solvents, such as benzene, toluene, water, dioxane, mixtures of water and dioxane, and other types of solvent mixtures which are chemically inert under the conditions of reaction. Polymerizations carried out in the absence of any solvent usually give polymers with higher viscosities than those in solution. Toluene was the best solvent found for the Lewis acid-catalyzed polymerizations.

In order to obtain higher molecular weight polymers, ethyleneimine or an N-substituted ethyleneimine can be copolymerized with a polyaziridinyl compound which contains hydrolytically stable linkages between nitrogen and another element. Such bonds are nitrogen to phosphorus, nitrogen to silicon, nitrogen to sulfur, and nitrogen to carbon. The polyaziridinyl compounds have the following general formula:

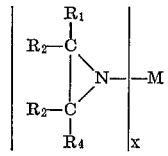

where $R_1$, $R_2$, $R_3$ and $R_4$ represent hydrogen or hydrocarbon (e.g., methyl, ethyl, etc.), $x$ is at least 2, and M represents an atom or group linked to the nitrogen atom through phosphorus, silicon, sulfur or carbon. The group M can also contain oxygen. As examples, M can equal S, SO or $SO_2$, in which case $x$ is 2; or M can equal Si, in which case $x$ is 4. The value of $x$ will ordinarily not exceed 5. Particularly good results have been obtained by using trisaziridinyl phosphine oxide and dimethyl diaziridinyl silane.

By using the polyazirldnyl compounds as cross linking agents, copolymers having average molecular weights about 100,000 and as high as 250,000, have been obtained. The polymerization is preferably followed by hydrolysis to remove some of the side chains and the resultant polymers are substantially linear.

Except for the addition of the cross linking agents, the general procedure, the type and amount of catalyst, the solvent, and the reaction conditions are the same when the cross linking agent is employed as when no cross linking agent is used.

The amount of cross linking agent will substantially affect the molecular weights of the resultant polymers. High molecular weights ranging from 50,000 to 100,000 or higher can be obtained by adding trisaziridinyl phosphine oxide to ethyleneimine in a mole per cent from 0.6 to 0.75%. Thus, the amount of cross linking agent need not exceed 5% and in most cases will be within the range of 0.5 to 5 mole percent of total monomer.

The invention will be further illustrated but is not limited by the following examples in which the quantities are stated in parts by weight, unless otherwise indicated.

Example I

A mixture of 95 mole percent of N-acetylaziridine and 5 mole percent trisaziridinyl phosphine oxide was placed in a three-necked flask and diluted with water to form a 33% by weight solution. With the mixture at room temperature (about 20° C.) the polymerization reaction was initiated by adding 0.5 mole percent hydrochloric acid, based on the total amount of monomers present. The solution was then allowed to reflux for several hours until a viscous solution was obtained which contained no unreacted monomers. A slight excess of sodium hydroxide was then added and the refluxing was continued until a polyamine of approximately 100,000 molecular weight containing very small amounts of tertiary amine was obtained. The polymer was separated by conventional separation techniques.

Example II

The procedure was the same as in Example I except that ethyleneimine was used instead of N-acetylaziridine and the quantity of trisaziridinyl phosphine oxide was 0.6 to 0.75 mole percent of the ethyleneimine.

Viscosity measurements were made with a Brookfield viscometer directly on the reacted solutions of the polymer. By regulating the quantity of cross linking agent and time of refluxing, polymer solutions were obtained having viscosities in centipoises of 350, 740, 1,000, 2,000, 6,300 and 64,000.

Example III

The procedure is the same as in Examples I and II except that N-methylethyleneimine is employed as the ethyleneimine monomer.

Example IV

The procedure is the same as in Examples I and II except that N-(2-hydroxyethyl)ethyleneimine is employed as the ethyleneimine monomer.

Example V

The procedure is the same as in Example I except that dimethyldiaziridinyl silane is employed in place of trisaziridinyl phosphine oxide.

Example VI

The procedure is the same as in Example I except that no cross linking agent is used.

It will be recognized that the process can be carried out with the various proportions of catalysts and with various solvents. The concentration of the catalyst can also be varied and the concentration of the monomers in solution prior to the addition of the catalyst can be varied. Where solvents have been used to dissolve the monomer, concentrations within the range of 10% to 90% of monomer can be employed. The monomer can also be used without a solvent.

In using hydrochloric acid as a catalyst, mole ratios of catalyst to monomer within the range of 1:100 to 1:1000 have been used. In using sulfuric acid as a catalyst, mole ratios within the range of 1:200 to 1:50 have been used. The same general range applies to phosphoric acid. In using boron trifluoride etherate, mole ratios within the range of 1:1400 to 1:40 have been used. The same ratios can be used for boron trifluoride urea and paratoluene sulfonic acid.

The temperature of catalyst addition is varied from −60° C. to 90° C. The catalyst has been added to the monomer and the monomer has been added to the catalyst by gradual additions. Emulsion polymerization using emulsifiers such as octylphenoxy polyethoxyethanol (Triton X) can be employed.

The following examples illustrate some of these variations.

Example VII

The apparatus used was the same as that used in Example I. N-methylethyleneimine was used as the monomer. It was placed in a three-necked flask, diluted with water to a concentration of 40% by weight and was cooled in an ice bath to 5–10° C. Hydrochloric acid was then added in one portion in a catalyst:monomer mole ratio of 1:60. The solution was then allowed to reflux for approximately 5 to 8 hours at the boiling point.

After completion of the polymerization, the water was evaporated under vacuum and a fraction of the polymer diluted to a 5% aqueous solution. The inherent viscosity was measured with an Ostwald viscometer at room temperature (20° C.). In this case the viscosity was 0.058.

Example VIII

The procedure was the same as in Example VII except that the solvent was toluene, the monomer concentration was 50% by weight, the catalyst employed was boron trifluoride ethylether, the catalyst:monomer mole ratio was 1:50, the reflux temperature was around 51° C. and the inherent viscosity was 0.055.

The invention makes it possible to produce substantially linear polyamine polymers of low molecular weight, as well as polymers of high molecular weight. In general, the homopolymers have a low molecular weight of 1000 to 2000 and the copolymers can have either a low molecular weight or a high molecular weight, the latter being within the range of 50,000 to 250,000. The invention, therefore, is very flexible in the type of polymer that can be produced. At the same time, the process makes it possible to produce polymer compositions having little, if any, non-linear polymers.

The polymerization is preferably carried to the point short of gel formation where a viscous solution is obtained. The resultant polymers are water soluble (or water dispersible) polyelectrolytes having a great number of cationic sites. The process can also be carried further to produce gels which are water insoluble. For example, by introducing $PF_5$ gas into a 30% solution of ethyleneimine or N-substituted ethyleneimine in toluene for several minutes, then flushing the system with nitrogen and refluxing to gel formation, an insoluble gel is formed. Insoluble gels are also formed by carrying the procedures described in the examples to gel formation. The resultant insoluble gels can be employed as anion exchange resins to abstract anions from aqueous or other types of solutions.

Where it is desired to remove side chains from the polymer which were introduced by the N-blocking substituents in the original monomer, it is preferable to employ an alkaline hydrolysis, for example, by using sodium hydroxide, ammonium hydroxide, or potassium hydroxide. Ordinary room temperatures or somewhat higher temperatures can be employed while taking precautions not to destroy the desired polymer. In some cases, the blocking substituent on the nitrogen atom of the monomer can be removed by hydrogenation.

The substantially linear water soluble (or water dispersible) polymers can be employed for a wide variety of purposes but are especially useful as polyelectrolytes in the coagulation of low turbidity water (for example, the removal of clay or minerals from water), the flocculation or de-watering of sewage, the settling of coal slurries, the coagulation of rubber latex, the addition to paper pulp slurries for the purposes of retaining fine fibers or to improve the wet strength, and the breaking of oil-in-water emulsions. The quantities of polyelectrolyte required will vary depending upon the particular type of suspension or emulsion but in general, small quantities within the range of 5 to 250 parts per million of coagulant can be employed. In treating low turbidity waters, usually 5 to 15 parts of coagulant per million parts of suspension will suffice. In de-watering sewage, larger quantities are usually required. In order to increase the wet strength of paper, 0.5% to 5% resin, on the weight of the total fibers (on a dry basis) can be used.

The invention is hereby claimed as follows:

1. A process for producing high molecular weight water soluble polymers which comprises polymerizing in the presence of an acidic catalyst a monomer from the group consisting of ethyleneimine and N-substituted ethyleneimines in which the N-substituent is

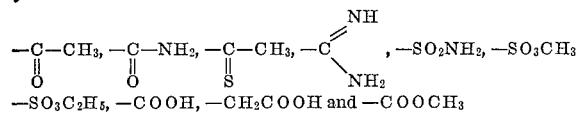

with a polyaziridinyl monomer containing hydrolytically stable linkages between nitrogen and another element, said polyaziridinyl monomer having the following formula

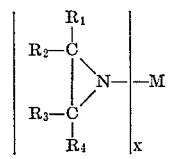

where $R_1$, $R_2$, $R_3$ and $R_4$ represent hydrogen or lower alkyl, $x$ is at least 2, but not greater than the valence of M, and M represents an atom or group linked to the nitrogen atom through phosphorus, silicon, or sulfur from the group consisting of S, SO, $SO_2$, Si and PO, the quantity of said polyaziridinyl monomer being 0.5 to 5 mole percent of total monomers, and stopping the polymerization reaction short of gel formation.

2. A process as claimed in claim 1 in which at least one monomer is an N-substituted ethyleneimine and the N-substituent is subsequently removed from the resultant polymer by alkaline hydrolysis.

3. A process as claimed in claim 1 in which the polyaziridinyl monomer is trisaziridinylphosphine oxide.

4. A process as claimed in claim 1 in which the polyaziridinyl monomer is dimethyldiaziridinyl silane.

5. A process as claimed in claim 1 in which the monomers are N-acetylaziridine and trisaziridinyl phosphine oxide.

6. A process as claimed in claim 1 in which the monomers are ethyleneimine and trisaziridinyl phosphine oxide.

7. A high molecular weight water soluble polymer which is the polymer obtained by polymerizing in the presence of an acidic catalyst a monomer from the group consisting of ethyleneimine and N-substituted ethyleneimines in which the N-substituent is

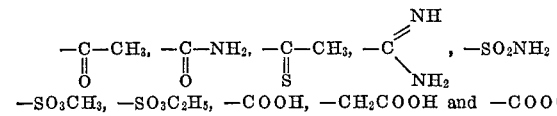

with a polyaziridinyl monomer containing hydrolytically stable linkages between nitrogen and another element, said polyaziridinyl monomer having the following formula

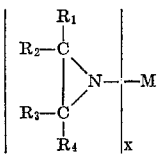

where $R_1$, $R_2$, $R_3$ and $R_4$ represent hydrogen or lower alkyl, $x$ is at least 2, but not greater than the valence of M, and M represents an atom or group linked to the nitrogen atom through phosphorus, silicon, or sulfur from the group consisting of S, SO, $SO_2$, Si and PO, the quantity of said polyaziridinyl monomer being 0.5 to 5 mole percent of total monomers, and stopping the polymerization reaction short of gel formation.

8. A copolymer as claimed in claim 7 in which at least one monomer is N-substituted ethyleneimine and the N-substituent has been removed from the resultant polymer.

9. A copolymer as claimed in claim 7 in which the polyaziridinyl monomer is trisaziridinyl phosphine oxide.

10. A copolymer as claimed in claim 7 in which the polyaziridinyl monomer is dimethyldiaziridinyl silane.

11. A copolymer as claimed in claim 7 in which one monomer is ethyleneimine and the polyaziridinyl monomer is trisaziridinyl phosphine oxide.

12. A copolymer as claimed in claim 7 in which one monomer is N-acetylaziridine and the polyaziridinyl monomer is trisaziridinyl phosphine oxide.

13. A copolymer as claimed in claim 7 which is a water soluble polyelectrolyte having an average molecular weight of at least 50,000.

14. A copolymer as claimed in claim 11 which is a water soluble polyelectrolyte having an average molecular weight in excess of 100,000.

15. A copolymer as claimed in claim 12 which is a water soluble polyelectrolyte having an average molecular weight in excess of 100,000.

References Cited

UNITED STATES PATENTS

| | | | |
|---|---|---|---|
| 2,269,997 | 1/1942 | Berchet | 260—2 |
| 2,312,863 | 3/1943 | Bestian | 260—2 |
| 2,339,046 | 1/1944 | Bestian | 260—239 |
| 2,626,931 | 1/1953 | Bestian | 260—2 |
| 2,830,045 | 4/1958 | Leumann et al. | 260—239 |
| 2,901,444 | 8/1959 | Chance et al. | 260—2 |
| 3,169,122 | 2/1965 | Hennes | 260—2 |
| 3,251,778 | 5/1966 | Dickson et al. | 260—2 |
| 3,256,248 | 6/1966 | Lee | 260—77.5 |
| 3,264,368 | 8/1966 | Lane et al. | 260—2 |
| 3,355,437 | 11/1967 | Tesoro et al. | 260—2 |

FOREIGN PATENTS

| | | |
|---|---|---|
| 834,990 | 3/1952 | Germany. |
| 863,055 | 1/1953 | Germany. |
| 976,570 | 11/1964 | Great Britain. |
| 899,955 | 9/1944 | France. |
| 957,308 | 8/1949 | France. |

OTHER REFERENCES

Manecke et al.: "Makromolekulare Chemie," vol. 82, Mar. 15, 1965, pp. 146–155.

SAMUEL H. BLECH, Primary Examiner

U.S. Cl. X.R.

162—164; 210—54; 252—338, 344; 260—2.1, 29.7, 77.5, 78, 79, 79.3, 239